United States Patent [19]

Megerle et al.

[11] Patent Number: 5,468,057
[45] Date of Patent: Nov. 21, 1995

[54] HYDRAULIC VEHICLE BRAKE SYSTEM WITH A HYDRAULIC UNIT FOR WHEEL SLIP CONTROL

[75] Inventors: Friedrich Megerle, Asperg; Guenther Hohl, Stuttgart; Erich Ludewig, Markgroeningen; Guenter Kaes, Stuttgart, all of Germany

[73] Assignee: Robert Bosch GmbH, Stuttgart, Germany

[21] Appl. No.: 393,792

[22] Filed: Feb. 24, 1995

Related U.S. Application Data

[62] Division of Ser. No. 50,788, Apr. 21, 1993, Pat. No. 5,417,481.

[30] Foreign Application Priority Data

Apr. 24, 1992 [DE] Germany ............... 42 13 524.9

[51] Int. Cl.⁶ ................ B60T 17/04; F15D 1/02
[52] U.S. Cl. ................ 303/87; 138/42; 138/44; 303/10; 303/116.1
[58] Field of Search .............. 138/40, 42, 44; 303/10, 11, 87, 116.1, 116.2, 116.4, 900; 417/540, 541

[56] References Cited

U.S. PATENT DOCUMENTS

| | | | |
|---|---|---|---|
| 3,820,571 | 6/1974 | Grier | 138/44 |
| 3,921,672 | 11/1975 | Arnold | 138/44 X |
| 4,557,296 | 12/1985 | Byrne | 138/44 |
| 4,807,945 | 2/1989 | Budecker et al. | 303/87 X |
| 5,320,203 | 6/1994 | Wilber et al. | 303/87 X |

FOREIGN PATENT DOCUMENTS

| | | | |
|---|---|---|---|
| 2566504 | 6/1988 | France. | |
| 2643860 | 3/1978 | Germany. | |
| 3248651 | 7/1984 | Germany | 303/87 |
| 3913352 | 10/1990 | Germany. | |
| 3924085 | 1/1991 | Germany. | |
| 8455 | 1/1983 | Japan | 303/87 |
| 4002635 | 8/1991 | Japan | 303/116.2 |
| 17413 | 8/1903 | Sweden | 138/42 |
| 1590003 | 5/1981 | United Kingdom. | |

OTHER PUBLICATIONS

111. Systematische Übersichtüber Dämpfungsmaβnahman in Druckleitungen, pp. 461 to 465, Ölhydraulik und pneumatik 20 (1976) No. 7, author J. Rébel.

*Primary Examiner*—Robert J. Oberleitner
*Assistant Examiner*—Alfred Muratori
*Attorney, Agent, or Firm*—Edwin E. Greigg; Ronald E. Greigg

[57] ABSTRACT

A hydraulic unit for wheel slip control, which is located between a master cylinder and wheel brake cylinders. Reflection damping devices are installed in main brake lines located between the hydraulic unit and the master cylinder which damp pressure waves that originate at control valves of the hydraulic unit. When the control valves are triggered in the wheel slip control mode the pressure waves are largely kept away from the master cylinder. By the means of length adaptation of the main brake lines, the brake lines can also contribute to the damping.

8 Claims, 6 Drawing Sheets

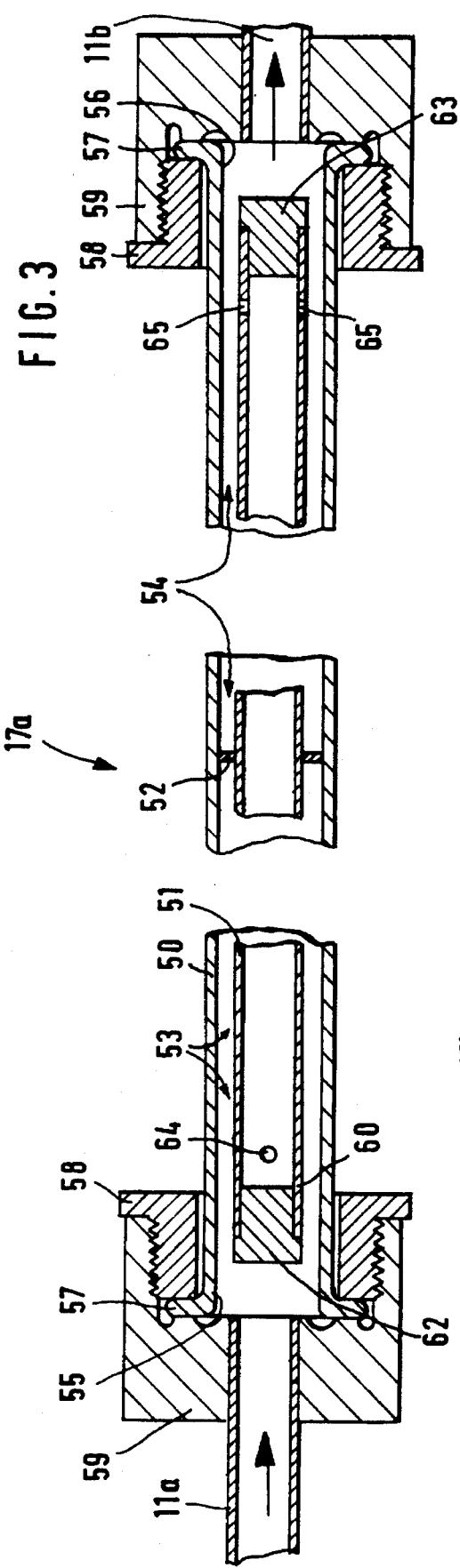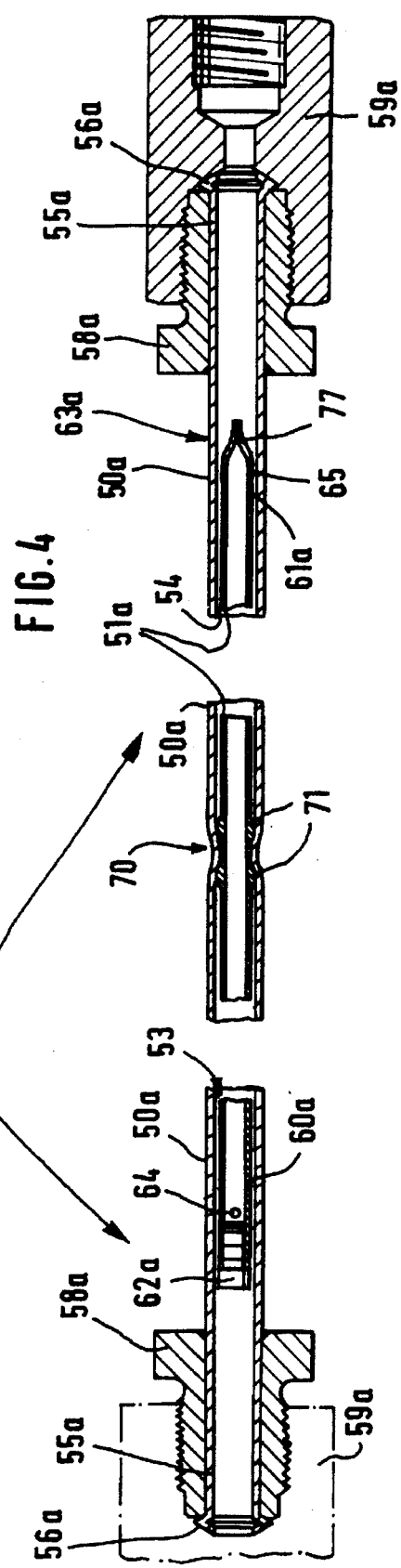

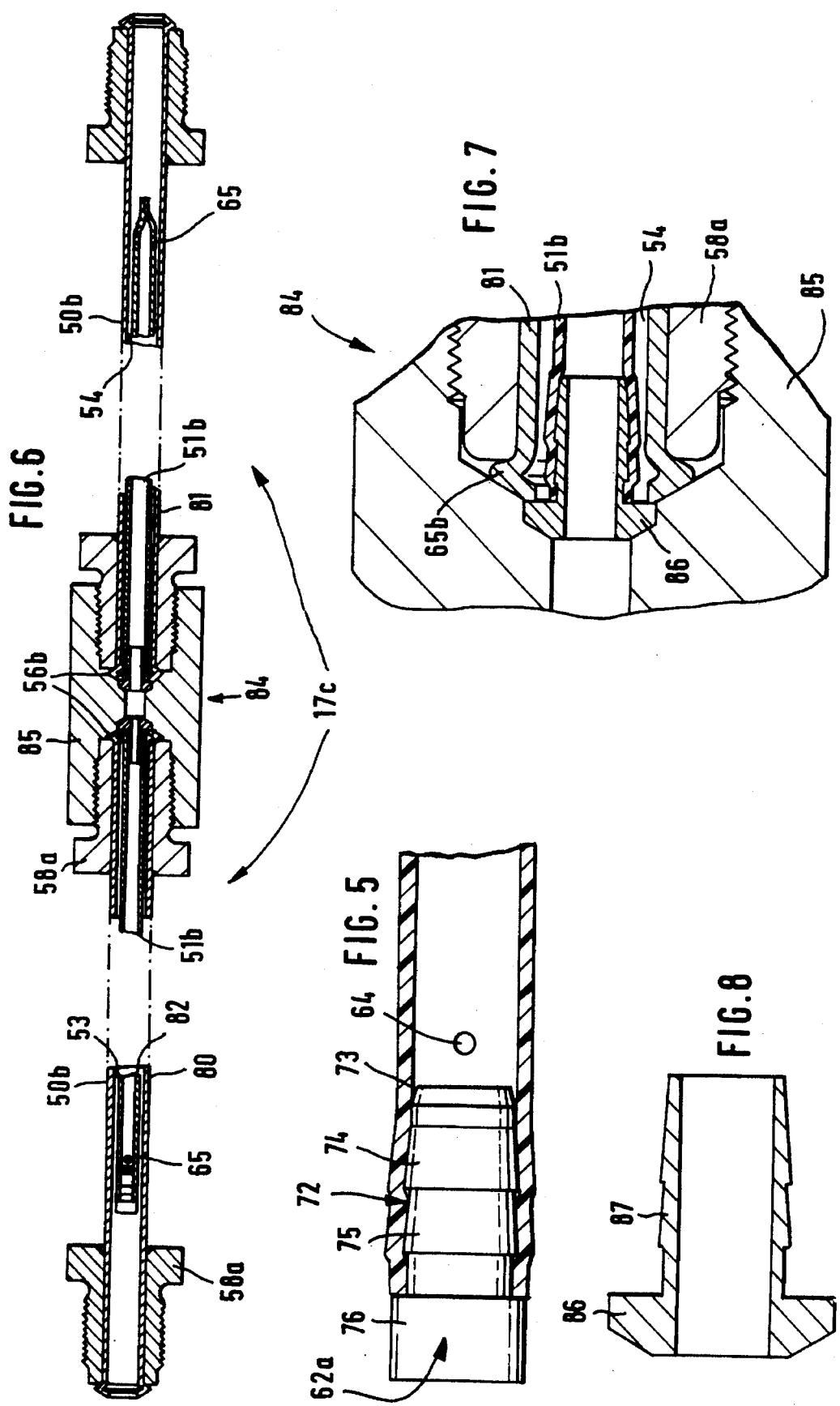

HYDRAULIC VEHICLE BRAKE SYSTEM WITH A HYDRAULIC UNIT FOR WHEEL SLIP CONTROL

This is a divisional of application Ser. No. 08/050,788, filed on Apr. 21, 1993, now U.S. Pat. No. 5,417,481.

BACKGROUND OF THE INVENTION

The invention is based on a hydraulic vehicle brake system as defined hereinafter for wheel slip control.

In such hydraulic units of hydraulic vehicle brake systems, damper chambers and damper throttles are disposed downstream of pressure outlets of pumps, which are designated as return pumps or auxiliary pumps, for instance; the damper chambers and damper throttles are intended to keep pressure pulsations originating at the pressure outlets and thus pressure waves largely away from the master cylinders. As British Patent 1,590,003 teaches, the damper chamber may be embodied as a substantially cylindrical hollow chamber in the housing, with an inlet opening located in the longitudinal axis of the hollow chamber. A throttle bore, which extends radially outward substantially half-way up the length of the hollow chamber, discharges into an outlet opening. The volumetric elasticity of the pumped pressure fluid is utilized for the damping. A further damping device is integrated into a pump housing, as taught by German Offenlegungsschrift 39 24 085, and as its damping element it has a radial-elastic hollow chamber located in the extension of an inlet opening, the hollow chamber being bounded by way of example by means of a length of hose fastened at both ends in a pressure-tight manner, and a shield body forming an outlet opening in the extension of the inlet opening. The radial-elastic hollow chamber acts similarly to an air chamber. The shield body is adapted to the exciter frequency, which is proportional to the pump rpm.

The aforementioned damping devices damp the pressure pulsations originating in the pumps and accordingly also damp pressure waves, so that the applicable pump cannot cause much irritating noise in the region of the master cylinder.

OBJECT AND SUMMARY OF THE INVENTION

The hydraulic vehicle brake system according to the invention has an advantage that pressure waves, unavoidably produced by control valves, such as brake pressure build-up valves downstream of the pumps and of the damping devices downstream from them, are damped along the way to the master brake cylinder and/or the wheel brake cylinders by means of reflections. Naturally residues of pressure waves originating in the pumps are then damped again. Another advantage is that because of the embodiment of the damper as a reflection damper, the hydraulic elasticity of the vehicle brake system in the region of the brake lines is increased only insignificantly.

The vehicle brake system as defined herein has an advantage that before the reflection of the pressure wave at the end of the chamber, speed amplitudes can be reduced uniformly and strongly over a relatively short distance. Damping already occurs as a result of the divergent speed directions. After reflection, the damping repeats as a result of convergent speed directions. Another advantage is that the pressure fluid carrying the pressure waves is enclosed between a housing core and the housing wall, which forms an acoustical reflection wall.

The invention has an advantage that by disposing of the transition from a conically widening chamber part to an annular-cylindrical chamber part, once the diameter of the housing or the end cross section of the chamber is fixed, and with a holder adapted to the diameter of the housing, the volume of the chamber can be adapted to the varying conditions from one vehicle type to another or to varying excitation frequencies by lengthening or shortening the chamber. The reflection damping device can also be installed retroactively in the master brake line by disconnecting it afterward. The features of the invention reinforces the damping.

The invention has an advantage of a reflection damping device that can be manufactured in a simple manner from lengths of metal or flexible line and with line connecting elements that are available on the market, for example. The characteristics of the invention improved dampings, and permits an economical manufacture of such reflection damping devices, which can be made from pipes or the like and screw connections.

Other characteristics of the invention make bleeding of the hydraulic brake system safe during servicing in garages and repair facilities.

The invention will be better understood and further objects and advantages thereof will become more apparent from the ensuing detailed description of preferred embodiments taken in conjunction with the drawings.

BRIEF DESCRIPTION OF THE DRAWINGS

FIG. 3 shows a second exemplary embodiment of a damping device;

FIGS. 4 and 5 show a third exemplary embodiment; and

FIGS. 6–8 show a fourth exemplary embodiment of the damping device.

DESCRIPTION OF THE PREFERRED EMBODIMENTS

Figure 1:
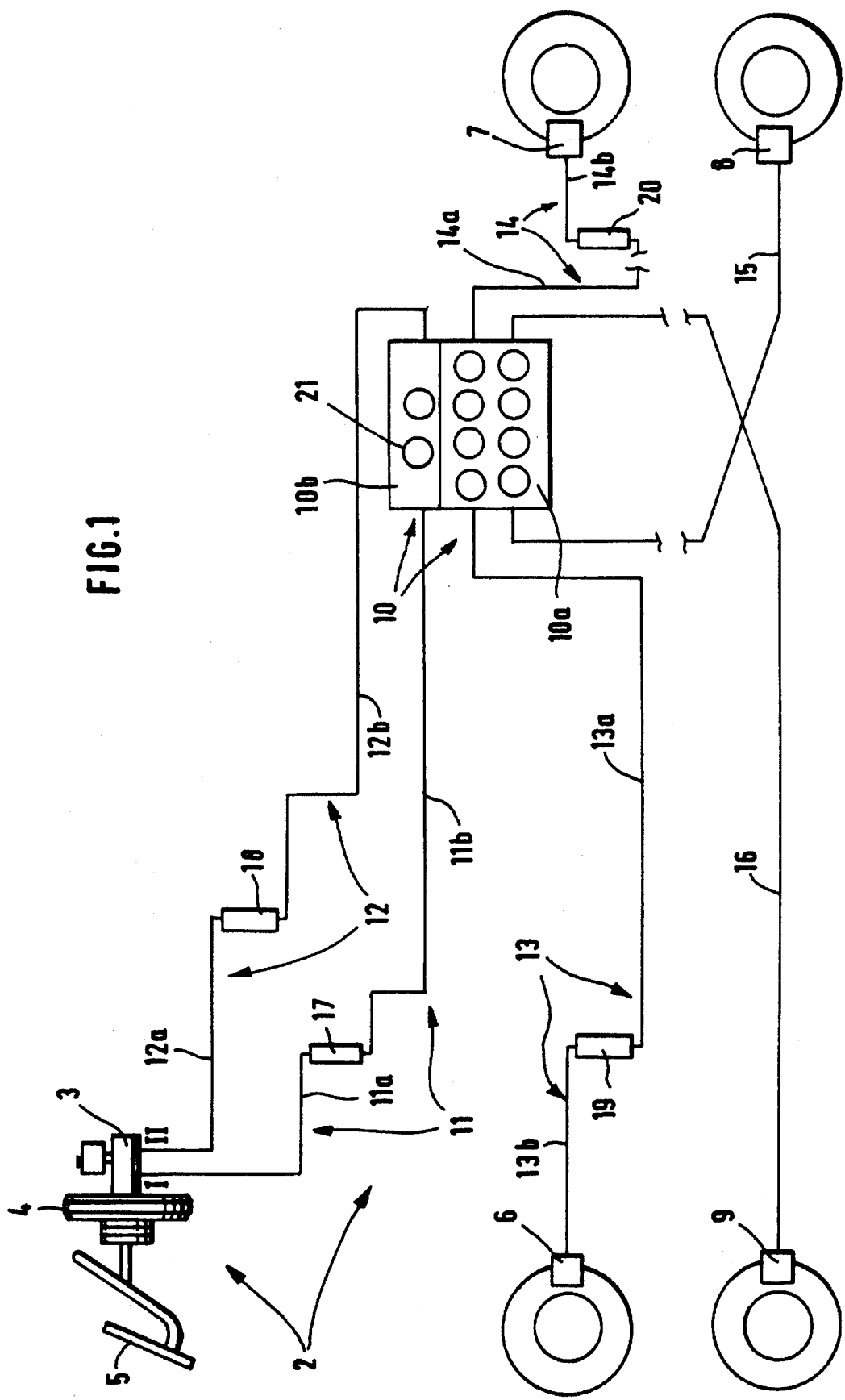
FIGS. 1, 1a and 1b schematically show the vehicle brake systems according to the invention.

The hydraulic vehicle brake system 2 according to the invention, as shown in FIG. 1, has a master cylinder 3 with two brake circuits I and II, a brake booster 4, a brake pedal 5 for controlling the brake booster 4 and the master cylinder 3, wheel brakes 6 and 7 for drivable wheels, not shown, and wheel brakes 8 and 9 for non-drivable wheels, not shown, and a hydraulic unit 10, a master brake line 11 belonging to brake circuit I, a master brake line 12 for brake circuit II, wheel brake lines 13 and 14 for the wheel brakes 6 and 7, respectively, further wheel brake lines 15 and 16 for the wheel brakes 8 and 9, and the reflection damping devices 17, 18, 19 and 20 according to the invention.

The master cylinder 3, the brake booster 4, the brake pedal 5, the wheel brakes 6, 7, 8, 9, and the hydraulic unit 10 can be found in the prior art.

The hydraulic unit 10 is arranged for wheel slip control and so may comprise a first component assembly 10a for carrying out braking slip control, and a further component assembly 10b for additionally carrying out drive slip control. To this end, the hydraulic unit 10 has pumps, not shown, and possibly known damping means disposed downstream of these pumps, as well as electromagnetically controllable control valves 21, which are used as brake pressure buildup valves, brake pressure reduction valves, and inlet shutoff valves toward the master cylinder. The design of the component assemblies 10a and 10b of the hydraulic unit 10 is described in detail in German Offenlegungsschrift 40 13 159 (as well as in the Published, International Application WO 91/16221 based on it). Naturally, it is possible instead of the aforementioned hydraulic unit 10 to use hydraulic units whose design differs from it, because within the context of the present patent application, the only crucial point is the disposition of reflection damping devices 17–20 and their design. The hydraulic unit 10 or a comparable unit and its mode of operation accordingly need not be described.

Figure 2:
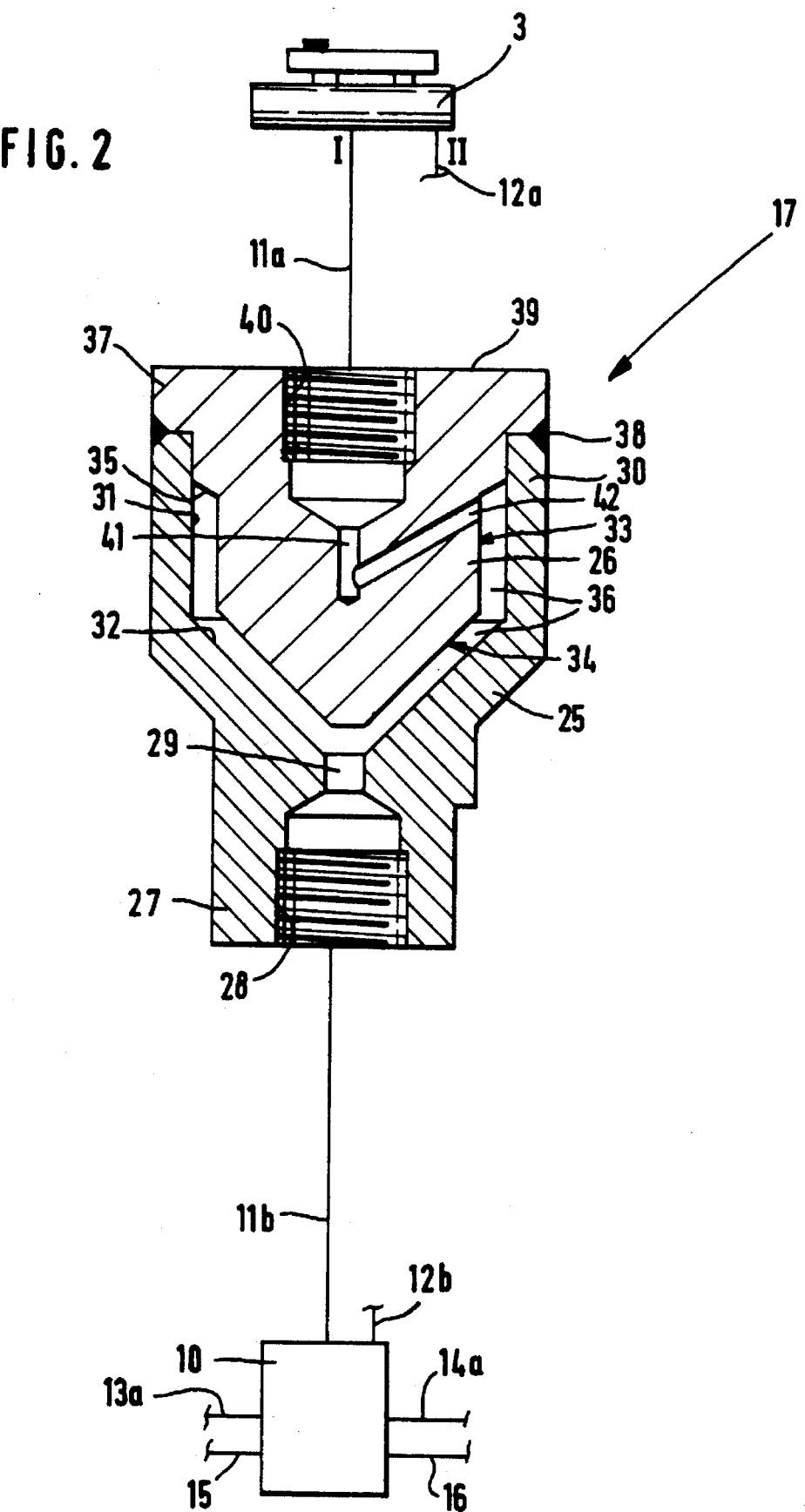
FIG. 2 shows a first exemplary embodiment in longitudinal section of a damping device for the vehicle brake system according to the invention.

In principle, the damping devices 17–20 may be identically embodied, in a manner shown in FIG. 2. The sizes of the reflection damping devices 17 and 18 need not match the sizes of the reflection damping devices 19 and 20.

The exemplary embodiment shown in FIG. 2 of a reflection damping device 17 according to the invention comprises a housing 25 with an inserted core 26. A threaded hole 28 for receiving a male pipe fitting, not shown, and a first connection opening 29 adjoining the threaded hole 28 are located at the lower end 27, as seen in the drawing, of the housing 25. A cylindrical bore 31 begins at the upper end 30 of the housing 25 and changes into a conical bore. The conical bore 32 meets the first connection bore 29. A cylindrical part 33 ad a conical part 34 of the core 26 extend into the two bores 31 and 32. A shoulder 35 located in the vicinity of the upper end 30 of the housing 25 and bordering the cylindrical part 33 defines on end of a chamber 36, which is located between the cylindrical bore 31, the cylindrical part 33, as well as the conical bore 32 and the conical part 34 and thus communicates with the connection opening 29. Adjoining the shoulder 35, the core 26 has a peripheral crimp 37, which forms an axial stop for the core 26 relative to the end 30 of the housing 25. The end 30 and the peripheral crimp 37 are joined in a fluid- and pressure-tight manner by means of a welded seam 38. A threaded hole 40 also begins at one free end 39 of the core 26, aligned with the longitudinal axis of the threaded hole 28. A second connection opening 41 embodied in the manner of a blind bore is located in the extension of the threaded hole, in the direction of the first connection opening 29. A throttle bore 42 is located between the chamber 36, in the region of its end 35, and the second connection opening.

Figure 1A:
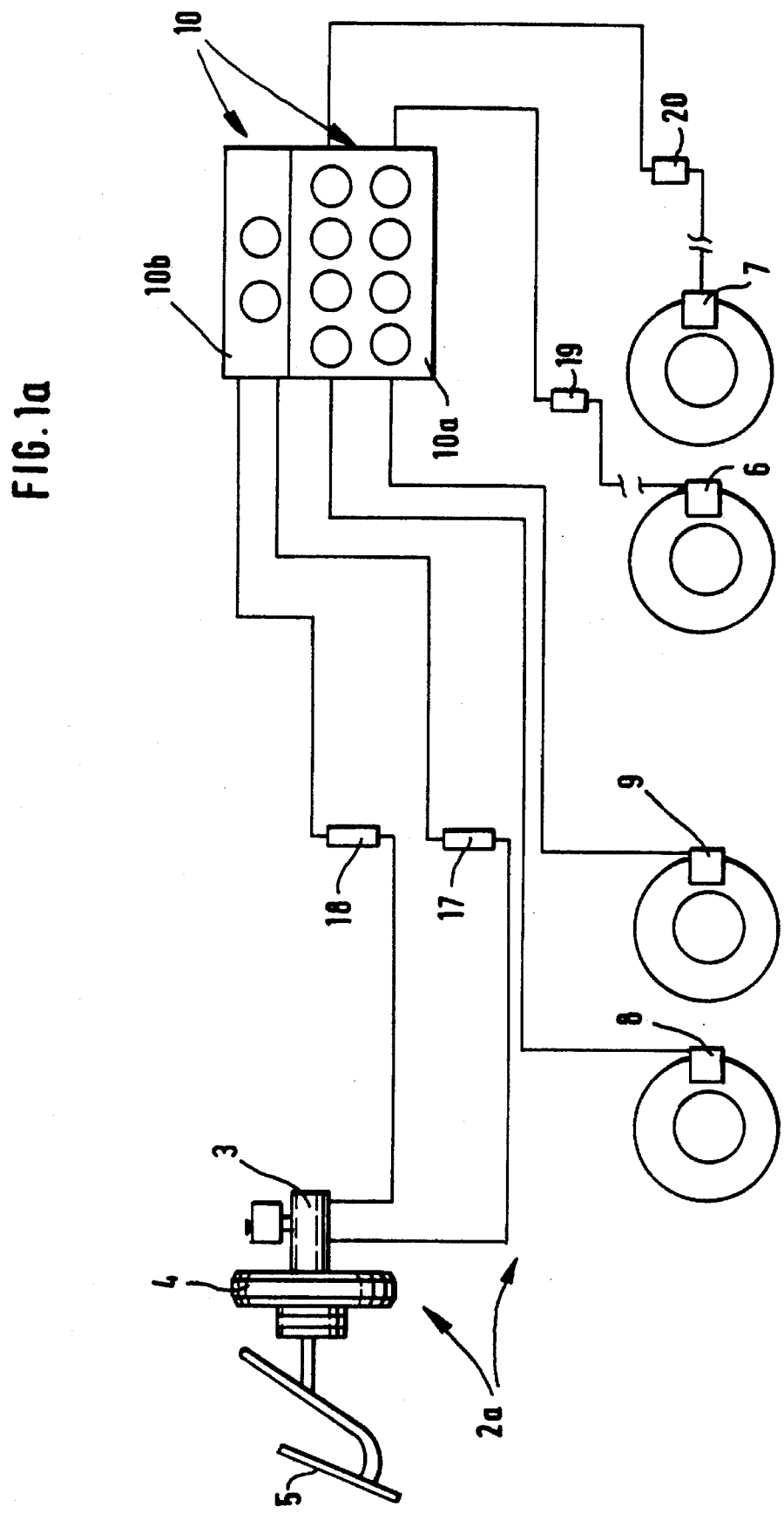
Figure 1B:
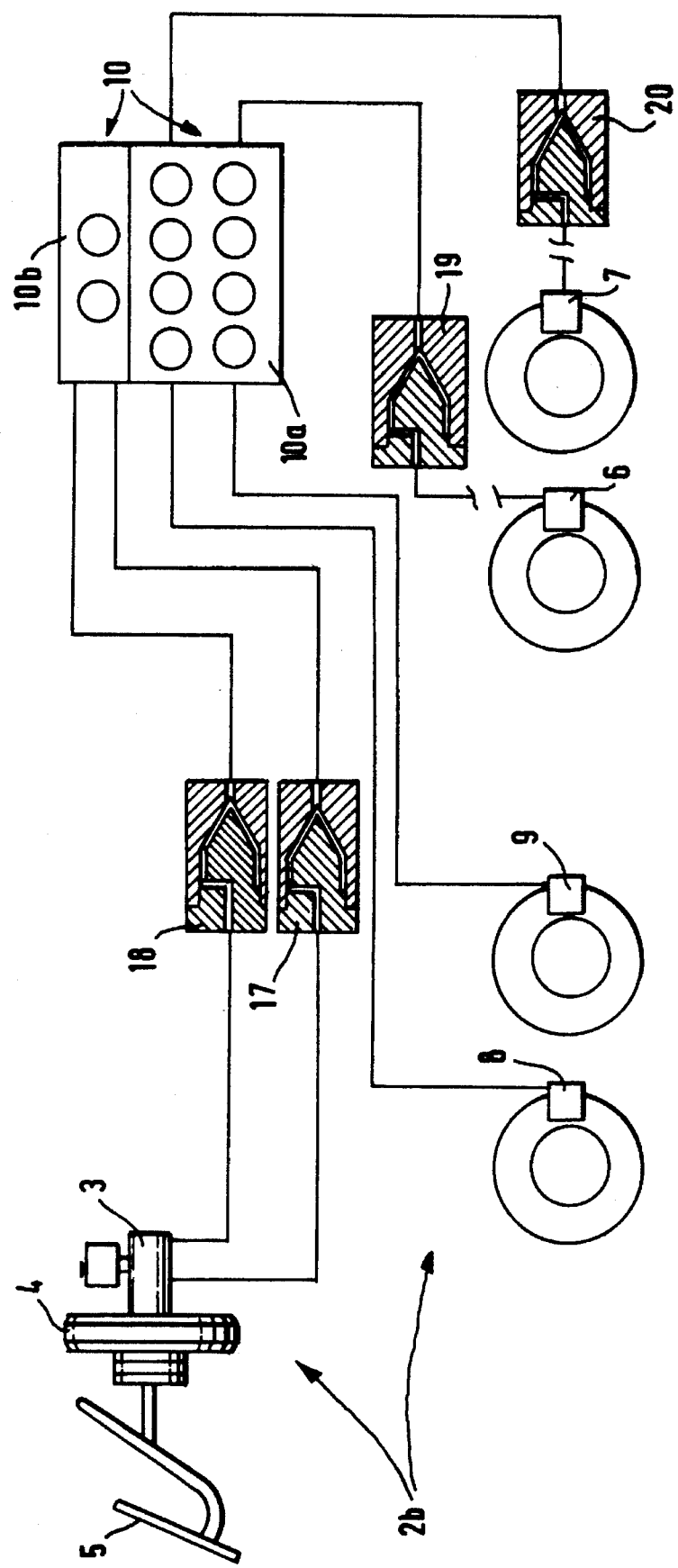

By way of example, the installed position of the housing 25 and core 26 corresponds to the alignment of these components shown in FIG. 2; that is, the first connection opening 29 is at the bottom and the second connection opening 48 at the top. Accordingly, the hydraulic unit 10 is connected to the bottom of the threaded hole 28. To that end, the master brake line 11 is subdivided into main brake line portions 11a and 11b; the main brake line portion 11b provides the communication between the threaded hole 28 and the hydraulic unit 10. The main brake line portion 11a is located between the thread 40 of the reflection damping device 17 of brake circuit I and the master cylinder 3. The reflection damping device 18 is connected to the master cylinder 3 via a main brake line portion 12a and to the hydraulic unit 10 via a second main brake line portion 12b. In a comparable way, the reflection damping devices 19 and 20, selectively assigned to the wheel brakes 6 and 7 of drivable wheels, are connected to the hydraulic unit 10 via wheel brake line portions 13a and 14a, respectively. Further wheel brake line portions 13b and 14b extend between the damping devices 19 and 20 and the wheel brakes 6 and 7, respectively. In the exemplary embodiment shown, no damping devices are provided for the wheel brakes 8 and 9 of the non-drivable wheels. Relative to the master cylinder 3 and to the hydraulic unit 10, the reflection damping devices 17 and 18 are installed by way of example, as shown in FIG. 1, such that these damping devices 17 and 18 are located after the master cylinder 3 but before the hydraulic unit 10. As a result, given the aforementioned substantially vertical alignment of the reflection damping devices 17 and 18, good bleedability in connection with servicing work is assured. For the sake of reliable bleeding, the reflection damping devices 19 and 20 are also preferably installed substantially at right angles; these reflection damping devices 19 and 20 are disposed at a lower level than the hydraulic unit. Another arrangement of the height of the hydraulic unit 10 is shown in FIG. 1a for a vehicle brake system 2a. As FIG. 1a shows, the reflection damping devices 19, 20 are again installed at a lower level than the master brake cylinder 3. Unlike FIG. 1, the hydraulic unit 10 is installed at a higher level than the reflection damping devices. Finally, the reflection damping devices 17, 18, 19 and 20 can be installed with reference axes aligned substantially horizontally, as FIG. 1b shows for a vehicle brake system 2b.

An advantageous size of the chamber 36 includes a volume of substantially 2.5 cm$^3$. The total chamber volume, as will already be apparent from the description, can be distributed between a conical chamber part and an annular-cylindrical chamber part. For installation in some other vehicle, which makes different demands in terms of chamber volume, the volume of the chamber may be varied within wide limits by lengthening or shortening the cylindrical bore 31 and the associated cylindrical part 33 of the core 26. As a result,, as already noted in the object and summary section, it is possible to use fastening elements, adapted to the diameter of the housing 25, for different vehicle types.

Mode of operation of the reflection damping device.

In the wheel slip control mode, to avoid the danger of wheel locking, control Valves 21 are actuated, and as a result pressure pulsations and hence pressure waves from the hydraulic unit 10 pass in the direction of the master cylinder 3 to reach the main brake line portion 11b. Through the first connection 28, the pressure waves enter the chamber 36 via connection opening 29, where they are distributed between the conical bore 32 and the conical part 34 over the cross section that is located between the cylindrical bore 31 and he cylindrical part 33 of the core 26. Accordingly, the pressure wave energy entering through the relatively narrow first connection opening 29 is distributed over a substantially larger cross section. At the end 35 of the chamber 36, the pressure waves arriving there are reflected and return to the first connection opening 29 and into the main brake line portion 11b as well. Accordingly, only a small portion of the arriving pressure wave energy passes through the narrow cross section of the throttle bore 42 and the second connection opening 41, aligned in an angle to the throttle bore to reach the particular main brake line portion 11a that finally leads to the master cylinder. It will be appreciated that accordingly only a small portion of the pressure wave energy originating in the hydraulic unit 10 reaches the master cylinder 3. As a result, relatively little pressure wave energy is converted into noise in the region of the master cylinder 3.

A damping effect within the pressure fluid occurs in addition, because of the fact that there is a substantially steady cross-sectional widening beginning at the narrow cross section of the first connection opening 29 and extending to the end 35 of the chamber 36, and accordingly divergent speed vectors are present in the pressure fluid. As a result, the viscosity of the pressure fluid results in internal damping. This effect of internal damping is repeated upon the reflection of the pressure waves back in the direction of the first connection opening 29. It is also advantageous in this respect that the damping device 17 comprises comparatively solid structural parts 25 and 26 and is a relatively large and therefore acoustically effective mass with respect to the enclosed pressure fluid.

The mode of operation of the reflection damping device 18 in the brake circuit II is the same as that of the reflection damping device 17.

In the wheel slip control mode, in order to limit drive slip, the master cylinder 3 is separated from the hydraulic unit 10. Upon braking for traction control, pressure surges reach the wheel brake line portions 13a and 13b and pass into the reflection damping devices 19 and 20, where they are subject to the same physical conditions as have already been described for the reflection damping device 17. As a result, the wheel brakes 6 and 7 are jarred less, which makes itself felt in an improved ride, less irritating noise, and improved traction. In principle, it would naturally be possible to assign damping devices to the wheel brakes 8 and 9 of non-drivable wheels as well. However, the expense of doing so is only worthwhile in exceptional cases, since the wheel brakes 8 and 9 are subject only to brake slip control, and because pressure peaks that occur in the brake slip control mode are not so pronounced as those in the drive slip control mode.

Tests have shown that not only is the disposition of the reflection damping devices 17–20 in the various lines important but that the effectiveness of damping can also be optimized by adapting the length of the line portions. It has accordingly been demonstrated that depending on given conditions, main line portions 11a and 11b with a length of 50 to 100 cm produce favorable damping results. Tests may naturally be made with other line lengths on a case to case basis. For the main line portions 11a and 12a, line lengths of substantially 50 cm are advantageous.

It has also been demonstrated that first adaptation tests using line lengths of substantially 50 cm are favorable for wheel brake line portions 13a and 14a that begin at the hydraulic unit 10.

A further exemplary embodiment, shown in FIG. 3, of a reflection damping device 17a that can be inserted into the lines 11, 12, 13, 14, described, or between their line portions 11a, 11b, 12a, 12b, 13a, 13b, 14a, 14b, substantially comprises an outer damper line 50 of metal, an inner damper line 51 of metal or plastic or the like, disposed substantially coaxially to the outer one, and a reflector 52 disposed in pressure-tight fashion between the outer damper line and the inner damper line 51. The reflector 52 may be secured to the outer damper line 50 in any arbitrary way, for instance using line connecting elements available on the market, and may be embodied such that it supports the inner damper line 51. The inner damper line 51 is embodied as shorter than the outer damper line 50. Inside the outer damper line 50, the reflector 52 defines two chambers 53 and 54, which between the inner damper line 51 and the outer damper line 50 have an annular cross section, at least in the region of the reflector 52. The inner damper line 51 has diameters that substantially match those of the lines 11, 12, 13 and 14, respectively. The outer damper line 50 has a larger diameter, resulting in the creation of the aforementioned annular cross section for the chambers 53 and 54.

For the sake of the pressure-tight disposition of the reflection damping device 17a between line portions, that is, the line portions 11a and 11b, the outer damper line 50, on its ends 55 and 56, has crimps 57 and male pipe fittings 58 that fit over the ends. These male pipe fittings 58 can be screwed into connection pieces 59, for instance for the line portions 11a, 11b, and these connection pieces can intrinsically be embodied arbitrarily.

Successful tests in vehicles have shown that a length of substantially 500 mm for the outer damper line 50 and of substantially 400 mm for the inner damper line 51 is favorable. The reflector 52 may be spaced apart by one end 60 of the inner damper line 51 by substantially 200 mm, for instance. It is also possible, however, if this produces more favorable damping action, for the reflector 52 to be shifted to anywhere between the aforementioned end 60 and the other end 61.

In adapting the length of the main brake line portions 11a and 11b, the procedure may be as described for the reflection damping device 17. The procedure is similar if the reflection damping device 17a is to be installed in wheel brake lines 13, 14. The reflection damping device 17a is preferable installed with the longitudinal axis of the outer damper line extending horizontally.

An improvement in the damping action is obtained if at least one additional reflector 62 or 63 is disposed on the face end of the inner damper line 52 and if at least one flow opening 64 or 65 is simultaneously furnished, preferably at the associated face end 60 or 61 of the inner damper line, so that despite the disposition of at least reflector 62 or 63 on the face end of this inner damper line 51, a flow through this line will still be possible. The at least one flow opening 64 or 65 may have a diameter of 1 mm, for instance, and then if disposed in pairs functions as at least one damping throttle, as a result of its narrow cross section.

A further exemplary embodiment of a reflection damping device 17b, shown in FIG. 4, is in principle designed identically to the reflection damping device 17a of FIG. 3. An outer damper line 50a has crimps 56a on both ends 55a and the crimps are embodied in the usual manner for the connection of motor vehicle brake systems. Accordingly, the male pipe fittings 58a associated with the crimps 56a are embodied as commercially available components and can be procured economically. Connection pieces 59a that can be screwed to the male pipe fittings 58a are adapted to receive the standardized crimps 56 and are for instance arranged for receiving other crimps, not shown, which for instance have a smaller rated diameter, so that conventional brake lines can be connected.

An inner damper line 51a is fixed to the outer damper line 50a by making a constriction 70, for instance. This type of fixation is reinforced, for instance, by the provision of two beads 71 against which the constriction 70 presses. Such beads 71 and the constriction are inexpensive to produce. One end 60a of the inner damper line 51a may be closed by means of the plug-like reflector 62 of FIG. 3, for example. However, a reflector 62a as shown in FIG. 5 is more advantageous, because its shaftlike part 72 has a plurality of conical zones 73, 74, 75, the larger diameter of each of which is located nearer than the headlike end 76 of the reflector 72 than their respective smaller diameter. Embodying the reflector 62a in this way makes it easier to install in the end 60a of the inner damper tube 51a, on the one hand, and on the other secures it better against slipping out. This reflector 62a can also be used for the exemplary embodiment of FIG. 3.

Once again, at least one flow opening 64 opens into the interior of the inner damper tube 51a near the reflector 62a.

A further end 61a of the inner damper tube 51a is inexpensively formed by the provision of a fishtail-like flattened face 77, for example, to make a reflector 63a. Adjacent this reflector 63a, there is once again a flow opening 65, which leads into the interior of the inner damper line 51a.

In the exemplary embodiment of FIG. 4, the beads 71 and the constriction 70 are the technical equivalent of the reflector 52, shaped as a wall, in the exemplary embodiment of FIG. 3. In addition, this reflection damping device 17b is adapted and disposed in the same way as already described for the reflection damping device 17a.

A further exemplary embodiment of a reflection damping device 17c, as shown in FIG. 6, differs from the exemplary embodiment of FIG. 4 in that the outer damper line 50b comprises two line pieces 80, 81, and the inner damper line 51b comprises two line pieces 82, 83. The line pieces 80, 81 are fixed relative to one another by the disposition of further crimps 56b, which protrude into a screwed pipe connection 84. The screwed pipe connection 84 comprises a sleeve 85 into which two of the known male pipe fittings 58a can be screwed. The line pieces 51b are likewise fixed inside the sleeve 85. This is accomplished by means of flanges 86, shown in FIG. 8, which are fastened between the crimp 56b and the sleeve 85 as the male pipe fittings are being screwed down. The flanges 86 are each adjoined by studs 87, which are press-fitted into the inner damper lines 51b. In the assembled state, the flanges 86 take on the tasks of the reflectors 52 described above. Otherwise, the line pieces 82, 83 may be equipped with the reflectors 62a and 63a shown in FIG. 4. This exemplary embodiment of FIG. 6 can likewise be produced economically, using standardized components. The same comments as for the exemplary embodiment of FIG. 3 apply to the adaptation here. In addition, it should be pointed out that the outer damper lines comprise metal, for example, and the inner damper lines comprise metal or plastic.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A hydraulic brake system for a vehicle, having a master brake cylinder, at least one wheel brake, a hydraulic unit that for wheel slip control includes at least one pump and at least one control valve, at least one damping device connected in the hydraulic vehicle brake system for damping pressure waves rising in the hydraulic pressure fluid in the vehicle brake system, at least one main brake line between the master cylinder and the hydraulic unit, and at least one wheel brake line between the hydraulic unit and the at least one wheel brake, the at least one damping device is embodied as a reflection damping device (17, 18, 19, 20; 17a, 17b) and is installed between the master cylinder (3) and the at least one wheel brake (6, 7, 8, 9), said reflection device (17a, 17b, 17c) has an outer damper line (50, 50a, 50b) with a length of substantially 500 mm and with an inside diameter that is larger than the inside diameter of the brake line (11, 12, 13, 14), and a substantially coaxially disposed inner damper line (51, 51a, 51b) with a length of substantially 400 mm and a diameter that substantially matches the diameter of the brake line, and, a reflector (52) installed in a pressure-tight fashion between ends (60, 61) of the inner damper line (51), in such a manner that two chambers (53, 54) are formed, one on each end of the reflector (52, 70, 71, 86 ) between the outer damper line (50) and the inner damper line (51).

2. A hydraulic brake system for a vehicle as defined by claim 1, in which the reflector (52, 70, 71, 86) is spaced apart by a distance of substantially 200 mm from an end (60 or 61) of the inner damper line (51).

3. A hydraulic brake system for a vehicle as defined by claim 2, in which at least one further reflector (62, 63) is secured to the inner damper line (51) on a face end, and that in the region of the reflector (62, 63), at least one through opening (64, 65) leads into the inner damper line (51), in such a way that a flow through this line is possible.

4. A hydraulic brake system for a vehicle as defined by claim 1, in which at least one further reflector (62, 63) is secured to the inner damper line (51) on a face end, and that in the region of the reflector (62, 63), at least one through opening (64, 65) leads into the inner damper line (51), in such a way that a flow through this line is possible.

5. A hydraulic brake system for a vehicle as defined by claim 4, in which the at least one through opening (64, 65) forms a throttle restriction.

6. A hydraulic brake system for a vehicle as defined by claim 1, in which the reflection damping device (17a, 17b, 17c) is assembled, using conventional crimps (56, 57, 56a) for brake line ends and associated conventional commercial male pipe fittings (58a).

7. A hydraulic brake system for a vehicle, having a master brake cylinder, at least one wheel brake, a hydraulic unit that for wheel slip control includes at least one pump and at least one control valve, at least one damping device connected in the hydraulic vehicle brake system for damping pressure waves rising in the hydraulic pressure fluid in the vehicle brake system, at least one main brake line between the master cylinder and the hydraulic unit, and at least one wheel brake line between the hydraulic unit and the at least one wheel brake, the at least one damping device is embodied as a reflection damping device (17, 18, 19, 20; 17a, 17b) and is installed between the master cylinder (3) and the hydraulic unit (10), said reflection device (17a, 17b, 17c) has an outer damper line (50, 50a, 50b) with a length of substantially 500 mm and with an inside diameter that is larger than the inside diameter of the brake line (11, 12, 13, 14), and a substantially coaxially disposed inner damper line (51, 51a, 51b) with a length of substantially 400 mm and a diameter that substantially matches the diameter of the brake line, and a reflector (52) installed in a pressure-tight fashion between ends (60, 61) of the inner damper line (51), in such a manner that two chambers (53, 54) are formed, one on each end of the reflector (52, 70, 71, 86) between the outer damper line (50) and the inner damper line (51).

8. A hydraulic brake system for a vehicle, having a master brake cylinder, at least one wheel brake, a hydraulic unit that for wheel slip control includes at least one pump and at least one control valve, at least one damping device connected in the hydraulic vehicle brake system for damping pressure waves rising in the hydraulic pressure fluid in the vehicle brake system, at least one main brake line between the master cylinder and the hydraulic unit, and at least one wheel brake line between the hydraulic unit and the at least one wheel brake, the at least one damping device is embodied as a reflection damping device (17, 18, 19, 20; 17a, 17b) and the at least one reflection damping device (19, 20, 17a, 17b) is installed between the at least one wheel brake (6, 7, 8, 9) and the hydraulic unit (10), said reflection device (17a, 17b, 17c) has an outer damper line (50, 50a, 50b) with a length of substantially 500 mm and with an inside diameter that is larger than the inside diameter of the brake line (11,

12, 13, 14), and a substantially coaxially disposed inner damper line (51, 51*a*, 51*b*) with a length of substantially 400 mm and a diameter that substantially matches the diameter of the brake line, and a reflector (52) installed in a pressure-tight fashion between ends (60, 61) of the inner damper line (51), in such a manner that two chambers (53, 54) are formed, one on each end of the reflector (52, 70, 71, 86) between the outer damper line (50) and the inner damper line (51).

* * * * *